United States Patent [19]
Mar

[11] 3,814,951
[45] June 4, 1974

[54] MULTIPLE FUNCTION LOGIC CIRCUIT

[75] Inventor: Jerry Mar, Scotch Plains, N.J.
[73] Assignee: Bell Telephone Laboratories, Incorporated, Murray Hill, N.J.

[22] Filed: Nov. 15, 1972
[21] Appl. No.: 306,733

[52] U.S. Cl. .................. 307/215, 307/285, 307/318
[51] Int. Cl. ...................... H03k 19/34, H03k 19/36
[58] Field of Search ........... 307/208, 217, 215, 218, 307/317, 285, 318

[56] References Cited

UNITED STATES PATENTS

| | | | |
|---|---|---|---|
| 3,007,059 | 10/1961 | Skerritt | 307/317 |
| 3,032,664 | 5/1962 | Rowe | 307/215 |
| 3,075,085 | 1/1963 | Helbig | 307/317 |
| 3,092,729 | 6/1963 | Cray | 307/215 |
| 3,117,240 | 1/1964 | Clapper | 307/215 |
| 3,192,406 | 6/1965 | Somlyody | 307/317 |
| 3,201,600 | 8/1965 | Cosby | 307/215 |
| 3,278,755 | 10/1966 | Czok | 307/215 |
| 3,303,355 | 2/1967 | Kolling | 307/215 |
| 3,304,436 | 2/1967 | Klinikowski | 307/317 |
| 3,427,474 | 2/1969 | Chua | 307/218 |

*Primary Examiner*—John S. Heyman
*Attorney, Agent, or Firm*—W. L. Keefauver; I. Ostroff

[57] ABSTRACT

A logic circuit configuration which can be utilized to perform NOR and NAND logic operations, comprises a junction transistor, a plurality of input diodes and a diode used for resetting the circuit. The amplitude of a voltage pulse applied to a control terminal coupled to the emitter determines which of two logic functions is obtained.

6 Claims, 1 Drawing Figure

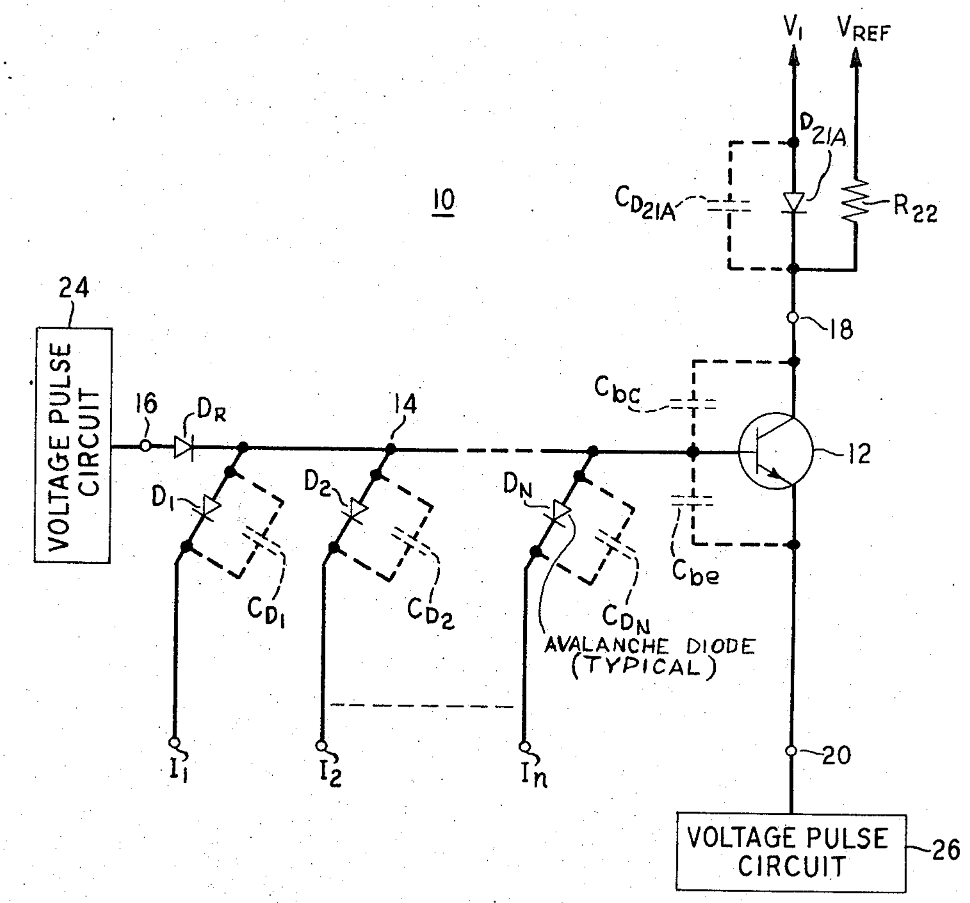
V1
VREF
D21A
CD21A
R22
10
24
VOLTAGE PULSE CIRCUIT
16
DR
14
18
Cbc
12
D1
D2
DN
CD1
CD2
CDN
Cbe
AVALANCHE DIODE (TYPICAL)
I1
I2
In
20
VOLTAGE PULSE CIRCUIT
26

MULTIPLE FUNCTION LOGIC CIRCUIT

BACKGROUND OF THE INVENTION

This invention relates to semiconductor logic gates and, more particularly, to a circuit which may be utilized to perform multiple logic functions.

Many of today's logic circuits can be utilized to perform basically only one type of logic function such as OR/NOR or AND/NAND logic. It would be very desirable if a circuit were available to perform multiple logic functions such as NOR and NAND type logic functions without having to rewire or in any other way change the circuit configuration.

OBJECTS OF THE INVENTION

It is an object of this invention to provide a circuit which may be utilized to perform multiple logic functions without the necessity of having to modify the actual schematic of the circuit.

SUMMARY OF THE INVENTION

This and other objects of the invention are attained in an illustrative embodiment thereof which comprises a junction transistor, a first diode coupled to the base of the transistor, a plurality of second diodes also coupled to the base of the transistor and a voltage clamp circuit coupled to the collector of the transistor.

In the preferred embodiment of the invention the transistor is an NPN-type transistor and the cathode of the first diode and the anodes of the second diodes are coupled to the base of the transistor. The anode of the first diode serves as a reset terminal while the cathodes of the second diodes serve as input terminals to the circuit. A control terminal is coupled to the emitter. The output signal occurs at the collector of the transistor.

The above described circuit is operated to obtain a NOR-type logic function as follows: the potential of the base of the transistor is first set to a reference level by applying an appropriate potential to the reset terminal. Appropriate input signals ("1's" and "0's") are applied to the input terminals and then a negative polarity voltage pulse is applied to the emitter terminal. If all of the input signals are 0's, the emitter base junction of the transistor is forward biased and conduction occurs within the transistor. This conduction can be monitored at the collector. If any of the inputs is in the 1 state, the base of the transistor will assume a potential close to that of the 1 potential, thereby not allowing the emitter base junction to be forward biased and inhibiting conduction in the transistor. The lack of conduction in the transistor is indicative of an output 0 signal. An NOR-type gate logic function is achieved since the output signal only assumes the 1 level only if all the inputs are 0' s.

To operate the above-described circuit in order to obtain a NAND-type logic function, the same operation described above is followed. However, the amplitude of the negative polarity voltage pulse applied to the emitter terminal is increased such that if any of the inputs are 0's, the second diode corresponding to that input signal is forced to operate in avalanche breakdown, thereby allowing a flow of current to the base of the transistor which in turn allows conduction within the transistor. This conduction is indicative of an output 1 signal. If all the inputs are 1's, then none of the second diodes operate in avalanche breakdown and consequently there is no conduction within the transistor. This is indicative of an output 0 signal. An NAND-type logic function is achieved since an output 1 occurs except when all the inputs are 1's.

These and other objects, features and embodiments of the invention will be better understood from a consideration of the following detailed description taken in conjunction with the following drawing:

BRIEF DESCRIPTION OF THE DRAWING

The FIGURE illustrates the circuit schematic of one embodiment of the invention.

DETAILED DESCRIPTION

Referring now to the FIGURE, there is shown for illustrative purposes a circuit 10 which comprises an NPN junction transistor 12, a diode $D_r$ and a series of diodes $D_1, D_2 \ldots D_n$. The cathode of $D_r$ and the anodes of $D_1, D_2 \ldots D_n$ are coupled to the base node 14 of transistor 12. A terminal coupled to the anode of $D_r$ is denoted as node 16 and a terminal coupled to the collector of transistor 12 is denoted as node 18. Terminals connected to diodes $D_1, D_2 \ldots D_n$ are denoted as $I_1, I_2 \ldots I_n$. A terminal connected to the emitter of transistor 10 is denoted as node 20. The dashed line capacitances are the parasitic capacitances associated with the respective junctions. $C_{bc}$ is greater than $C_{be}$ or $C_{D_2}$, . . $C_{D_n}$.

Terminal 18 is shown connected to one terminal of a resistor $R_{22}$ and the cathode of a diode $D_{21}$ . The other terminal of the resistor $R_{22}$ is connected to a reference potential $V_{REF}$ and the anode of $D_{21A}$ is connected to a potential $V_1$, which is typically −5.7 volts. If there is no conduction through the transistor, the steady-state potential of node 18 is at approximately the reference potential. If there is steady-state conduction through the transistor, the potential of node 18 is equal to $V_1$ minus the voltage drop across $D_{21A}$. The combination of $R_{22}$ and $D_{21A}$ act as an output voltage clamp which prevents the output signal appearing at node 18 from becoming more negative than approximately −5 volts.

If there is steady-state conduction through the transistor, the output signal is approximately −5 volts, but if there is no conduction through the transistor, the output signal is at the reference potential, which is approximately zero volts.

In order to operate the circuit of the FIGURE to obtain a NOR-type gate function, the following procedures are followed: terminal 16 is initially set to a reference potential which is typically 0 volts. All other terminals of the circuit are allowed to float in potential or are held at the reference potential. A negative polarity voltage pulse is then applied to terminal 16 by voltage pulse circuit 24, which reverse-biases $D_r$, thereby temporarily holding the potential of base node 14 at the reference potential. Typically, the amplitude of this negative voltage pulse is −6 volts. Concurrently with the negative polarity voltage pulse applied to node 16, 1 and 0 inputs are applied to input terminals $I_1, I_2 \ldots I_n$. A negative polarity voltage pulse of typically −5 volts is applied to terminal 20 by voltage pulse circuit 26, just after the input pulses have been applied. A 1 is typically −5 volts and a 0 is typically 0 volts.

If any of the inputs $I_1, I_2 \ldots I_n$ are 1's (−5 volts), base node 14 is very rapidly lowered in potential from the reference potential (0 volts) to approximately −5 volts. Since the emitter potential, node 20, is then lowered to −5 volts, the emitter base junction has substantially zero forward bias and therefore there is no conduction in transistor 12. This means that the output voltage signal is a 0 (0 volts).

If all of the inputs $I_1, I_2 \ldots I_n$ are "0's" (0 volts), the emitter base junction is transiently forward-biased when the emitter potential (node 20) drops to −5 volts since diodes $D_1, D_2 \ldots D_n$ are reverse-biased and have no effect on the potential of node 14, which is at the reference potential. The forward-biased emitter junction causes transient conduction in transistor 12. The output of the circuit (node 18) therefore assumes the 1 level (−5 volts).

The output signal at node 18 is only a 1 if all of the inputs are 0's. This constitutes a NOR-type logic function.

In order to obtain a NAND-type gate function, the circuit 10 of the FIGURE is operated, using the same procedures as previously described to obtain a NOR-type gate function, except that node 20 is lowered in potential to typically −7 volts instead of −5 volts. If any of the inputs, $I_1, I_2 \ldots I_n$, are in the 0 state (0 volts), diodes $D_1, D_2 \ldots D_n$, which are connected to these inputs, are forced to operate in avalanche breakdown since the avalanche breakdown potential of these diodes is typically 6.1 volts. The operation of one or more of diodes $D_1, D_2 \ldots D_n$ in avalanche breakdown permits the base of transistor 12 to receive current, which in turn allows transistor 12 to conduct, and the output signal at node 18 to assume the 1 state.

If all of the inputs $I_1, I_2 \ldots I_n$ are in the 1 state, none of the diodes $D_1, D_2 \ldots D_n$ operate in avalanche breakdown and there is substantially no conduction in transistor 12. The output signal is therefore in the 0 state. There is, however, a transient −1 volt decrease in the output signal from the 0 level when all the inputs are 1's. This is due to the fact that after the leading edge of the negative polarity voltage pulse applied to node 20 reaches approximately −6 volts, the emitter base junction is momentarily forward-biased, thereby causing a portion of the negative polarity voltage pulse applied to node 20 to be coupled to node 18 via $C_{be}$ and $C_{bc}$. This excursion from the 0 level is too small to be confused as a 1 output signal and, therefore, is of little consequence.

When the circuit of the FIGURE is operated as outlined above, the output node 18 assumes a 0 level only if all of the inputs $I_1, I_2 \ldots I_n$ are 1's. This constitutes a NAND-type logic operation.

It is to be understood that the embodiments described are merely illustrative of the general principles of the invention. Various modifications are possible consistent with the spirit of the invention. For example, the NPN transistor can be replaced with a PNP transistor providing the diodes are appropriately reversed and the voltage pulse polarities are reversed.

What is claimed is:

1. A logic circuit comprising:

a junction transistor;

a first diode coupled to the base of the transistor;

a plurality of avalanche breakdown second diodes also coupled to the base of the transistor;

a first terminal coupled to the first diode;

a plurality of second terminals, one of each of the second terminals being coupled to a different one of the second diodes;

a third terminal coupled to the emitter of the transistor;

the circuit path between the emitter and base of the transistor being defined by a first capacitance;

the circuit path between the base and collector of the transistor being defined by a second capacitance;

the circuit paths between the anode and cathode of each of the second diodes being defined by a third capacitance;

the magnitude of the second capacitance being greater than that of either the first or the third capacitances;

first circuit means coupled to the first terminal for selectively causing the first diode to be forward-biased or reverse-biased; and second circuit means coupled to the third terminal for enabling one of the second diodes to operate in avalanche breakdown.

2. The apparatus of claim 1 wherein:

the transistor is an NPN-type transistor;

the cathode of the first diode is coupled to the base of the transistor; and the anode of each of the second diodes is coupled to the base of the transistor.

3. The apparatus of claim 2 further comprising:

a fourth terminal coupled to the collector of the transistor; and a voltage clamping circuit coupled to the fourth terminal.

4. The apparatus of claim 3 wherein the voltage clamping circuit comprises a diode and a resistor.

5. The apparatus of claim 1 wherein the first diode and the plurality of second diodes are oppositely coupled to the base of the transistor.

6. The apparatus of claim 5 wherein:

the first circuit means is a voltage pulse circuit that is characterized by an output voltage pulse which is of sufficient amplitude and proper polarity to first forward bias and then reverse bias the first diode; and the second circuit means is a voltage pulse circuit that is characterized by two separate output voltage pulses of different amplitudes, the greater amplitude pulse being of sufficient magnitude to selectively cause one of the second diodes to operate in avalanche breakdown.

* * * * *